Figure 1:
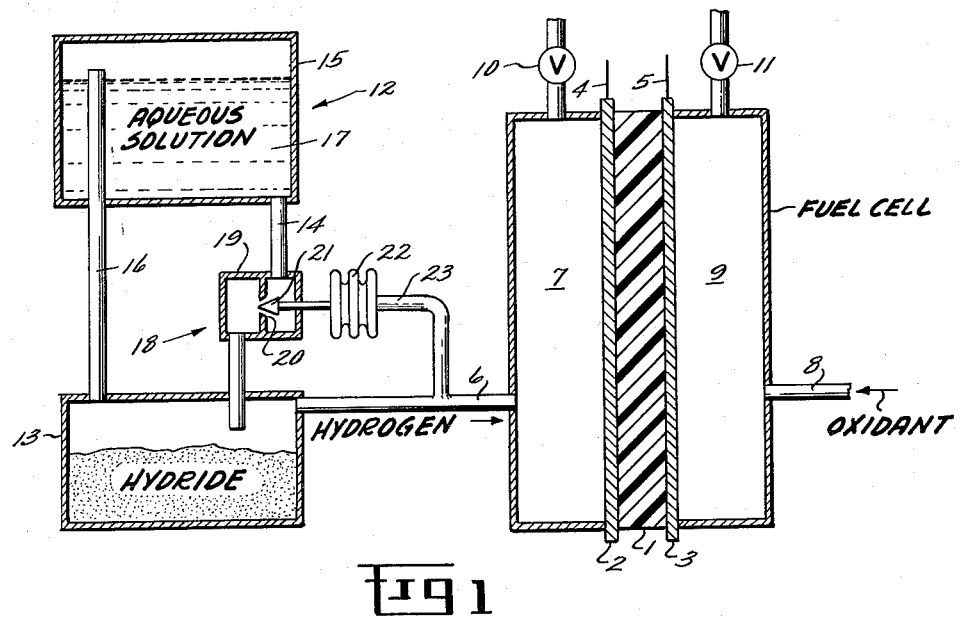

3,098,769
FUEL GAS GENERATOR CONTROL SYSTEM
FOR FUEL CELLS
Herman Alfred Liebhafsky and Leonard William Niedrach, Schenectady, N.Y., assignors to General Electric Company, a corporation of New York
Filed May 13, 1960, Ser. No. 29,032
5 Claims. (Cl. 136—86)

This invention relates to fuel gas generator control systems for fuel cells, and more particularly to an improved system for supplying fuel gas at a controlled rate to a fuel cell such as, for example, the kind shown and described by U.S. Patent No. 2,913,511 to Willard T. Grubb, Jr., entitled "Fuel Cell," which was issued November 17, 1959, and assigned to the assignee of the present application.

The subject matter of this application is referred to in the following copending applications, all assigned to the same assignee: Serial No. 861,704, entitled "Fuel Gas System for Fuel Cells," filed by R. H. Blackmer and W. A. Titterington on December 23, 1959; Serial No. 850,588, entitled "Fuel Battery," filed by E. J. Cairns and D. L. Douglas on November 3, 1959; and Serial No. 850,589, entitled "Fuel Cell," filed by L. W. Niedrach on November 3, 1959.

A fuel cell having a solid ion exchange electrolyte membrane is disclosed by the aforementioned patent, and this type of cell will hereinafter be referred to as a "solid electrolyte fuel cell" for convenience. According to the patent, an ion exchange resin membrane is placed between and in contact with a pair of permeable electrodes having catalytic properties, one of which may be exposed to an oxidant and the other to a fuel gas, for example, hydrogen. In the case of a cationic membrane, ionization of the fuel gas occurs at the anodic electrode, with the migration of electrons between the electrically connected electrodes to establish an electric current, and the migration of positively charged ions through the membrane to combine with the oxidant and free electrons at the cathodic electrode.

A convenient supply of fuel gas for the fuel cell is a generator comprising means for mixing suitable reactants at a controlled rate. For example, hydrogen may be liberated from hydride or borohydride chemicals by mixing an aqueous liquid solution or vapor with them at a controlled rate.

The rate of consumption of fuel gas by the fuel cell depends upon the rate of electric current generation, or current density over the surface of the membrane; and the density (and pressure, at a given temperature) of the fuel gas in the cell therefore also depends upon the rate of current generation. In order to maintain a current as required by a fixed or varying external load, it is necessary to maintain a rate of fuel gas supply to the fuel cell sufficient to offset a decrease in density of varying rate, caused by a varying rate of consumption of the fuel gas in the cell.

It is accordingly the object of our invention to provide a fuel gas generator control system which is operative to control the reaction rate of a fuel gas generator such as to maintain a preselected range of pressure or density of fuel gas in a fuel cell whose fuel gas consumption rate is subject to variation.

Further objects and advantages of our invention will become apparent as the following description proceeds.

Briefly stated, in accordance with one embodiment thereof, we carry out our invention by providing means for controlling the reaction rate of a fuel gas generator in response to the fuel gas pressure obtaining in a fuel cell chamber supplied thereby, in such manner as to maintain a preselected range of pressure in the chamber, which is subject to a varying fuel gas consumption rate. In this embodiment, the partial variation in pressure attributable to variation in gas temperature is ignored, so that control in response to density of the gas is accurately achieved only at a constant temperature. However, variations in temperature are ordinarily sufficiently small under actual working conditions of fuel cell systems that pressure is a practical parameter for control of density. For applications in which extremes of operating temperatures are experienced, we prefer to additionally provide temperature compensation means such that the control means responds to density directly, and maintains a preselected range of densities in the fuel cell.

Figure 2:
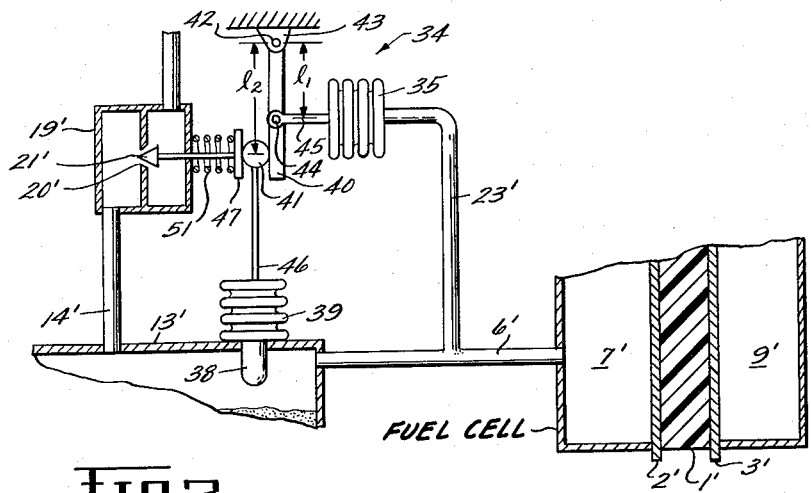

While the specification concludes with claims particularly pointing out and distinctly claiming the subject matter which we regard as our invention, it is believed that the invention will be better understood from the following description taken in connection with the accompanying drawing, in which:

FIG. 1 is a schematic representation of a preferred embodiment of a fuel gas generator control system for a fuel cell, made according to our invention; and FIG. 2 is a schematic representation of a fragmentary portion of fuel gas generator control system, showing a modification for temperature compensation of the control means.

Referring to FIG. 1, a fuel cell made according to the aforementioned Grubb Patent No. 2,913,511 is provided, comprising an ion exchange membrane 1 positioned between and in electrical contact with catalytic electrodes 8 and 3. Leads 4 and 5 connected to electrodes 2 and 3, respectively, are used to deliver electrical current to apparatus supplied by the cell. Fuel gas is supplied to electrode 2 through conduit means 6 and chamber 7. A valved outlet 10 is provided from chamber 7 to exhaust any impurities which enter the chamber from the fuel gas or any inert materials which are a product of the reaction of the fuel gas. The oxidant gas, which may be oxygen or air, is admitted into chamber 9 through conduit means 8. Chamber 9 contains a valved outlet 11 for the withdrawal of impurities in the oxidant gas, and of water vapor produced by the cell reaction. Thus, where the oxidant is air outlet 11 is employed to remove the nitrogen and water which build up in chamber 9. Alternatively or conjunctively, a drain conduit may be provided at the lower end of chamber 9 for removing the water in a liquid form.

By way of example, the membrane 1 may be a cation permeable membrane, having H+ ions as the mobile ion, and the fuel gas may be hydrogen and the oxidant air. In this case the overall cell reaction is the oxidation of hydrogen to water. In this reaction, the gaseous molecular hydrogen is ionized at electrode 2, with hydrogen ions migrating to electrode 3 through membrane 1, and electrons migrating to electrode 3 through electrode 2 and an external load connected to leads 4 and 5.

The rate of consumption of hydrogen by the fuel cell depends upon the external load and the rate of current generation, which may be fixed or varying. In order to maintain a rate of current generation according to demand, the rate of supply of hydrogen in chamber 7 must be controlled so as to maintain the density of hydrogen within limits which are experimentally determined. According to our invention, a fuel gas generator generally designated 12 is controlled in response to the pressure in conduit means 6 to maintain the gas density within the desired limits.

In the embodiment shown in FIG. 1, generator 12 is provided for the generation of hydrogen, by decomposition of solid hydrides or borohydrides contained in a tank 13. The decomposition process is carried out by releasing aqueous solution at a controlled rate into tank 13 through a tube 14 from a tank 15. A vent pipe 16 extends from tank 13 into a gas space 17 within tank 15, in order to establish pressure equilibrium for even flow of aqueous solution between the tanks. Tank 13 is connected in fuel gas flow relation with chamber 7 and electrode 2 by conduit means 6, for flow of hydrogen to the fuel cell in the direction shown by the arrow.

For controlling the reaction rate of generator 12, we provide pressure-responsive reaction control means generally designated 18. The control means include a valve chamber 19 placed in serial flow relation in tube 14, forming a flow-control orifice 20. Flow of aqueous solution through the orifice is regulated by a conical valve body 21, secured to a conventional pressure-responsive bellows 22. Bellows 22 is placed in pressure communication with conduit means 6 by a branch conduit 23. By these means, the hydrogen generation reaction rate is controlled by regulating the flow of aqueous solution to hydride tank 13, in such manner as to maintain a substantially uniform hydrogen pressure in fuel cell chamber 7.

Temperature variations are not great enough to cause variations in the density of hydrogen in chamber 7 which would exceed desired limits in a number of applications. This system is effective in such applications to maintain a pre-selected range of hydrogen density, although the hydrogen consumption rate of the fuel cell varies in operation.

In a further embodiment shown in FIG. 2, we provide temperature compensation means for the control means to regulate the flow of hydrogen in direct response to its density, rather than pressure as an approximation to density. Density of a gas is inversely proportional to its absolute temperature, and directly proportional to its pressure. The temperature-compensated pressure-responsive control means selected is a conventional dividing arrangement, generally designated 34, affording an output movement which is the result of the division of a pressure signal by a temperature signal. A pressure-responsive bellows 35 is subjected to the pressure obtaining in conduit means 6′, which is connected with a fuel cell chamber 7′, by means of a branch conduit 23′. A temperature-responsive gas bulb 38 extends into a hydride tank 13′ and communicates with a bellows 39. In order to divide control movements of bellows 35 by those of bellows 39, a variable lever arm linkage is provided, comprising a pivoted arm 40 and a ball pivot 41. Arm 40 is pivoted at 42 to a stationary support 43, and pivoted at 44 to a drive rod 45 secured to bellows 35. Ball 41 is drivingly connected with bellows 39 by means of a rod 46, for movement in a vertical line lying in the plane of FIG. 2, and is interposed between arm 40 and an enlarged head 47 of a conical valve body 21′. A valve chamber 19′ is interposed in conduit 14′, and forms an orifice 20′ whose area is regulated by valve body 21′. A compression spring 51 urges head 47 into engagement with ball 41. It will be apparent that movement of valve body 21′ will be proportioned to movement of bellows 35 according to the ratio $l_1$ to $l_2$, the distances from pivot 42 to their respective fulcrums with arm 40. Length $l_2$ is varied in inverse proportionality to the absolute temperature of the hydrogen in tank 13′. The physical constants of the control means are proportioned such that movement of the valve body will be in response to density of the hydrogen, rather than its pressure. This arrangement affords more precise response to density of the fuel gas, and thus to the rate of consumption by the fuel cell.

It will be apparent from the foregoing description that we have provided an improved fuel gas generator control system for fuel cells, which is operative in response to pressure or density, as desired, to control the density of fuel gas in a fuel cell which is subject to a variable fuel gas consumption rate, within predetermined limits. While we have illustrated and described particular embodiments of our invention, it will be apparent to those skilled in the art that various modifications may be made without departing from the spirit and scope of the invention. For example, various fuel gases other than hydrogen may be utilized, as described by the forementioned Grubb Patent No. 2,913,511, and these may be generated by suitable conventional reaction generators. Furthermore, various conventional pressure-responsive control means and temperature-compensation means may be utilized, other than those which have been described by way of example. In addition, the present invention is not limited in usefulness to the ion exchange membrane type fuel cell but is equally suitable for use in all other gas consuming types.

What we claim as new and desire to secure by Letters Patent of the United States is:

1. A fuel cell gas generator control system comprising, in combination: a fuel gas generator comprising means for mixing fuel gas-generating reactants and reaction control means operable to vary the rate of mixing of the reactants; a fuel cell comprising a pair of electrodes and an electrolyte positioned between and in contact with said electrodes, said fuel cell adapted to consume fuel gas; one of said electrodes communicating with said generator for fuel gas flow therebetween; said reaction control means being operable in response to the pressure of fuel gas supplied to said fuel cell by said generator to regulate the rate of mixing of the reactants such as to maintain a preselected range of pressures of said fuel gas.

2. A fuel cell gas generator control system as recited in claim 1, together with compensating means operable in response to the temperature of said fuel gas and operatively connected for modulation of said reaction control means to regulate the rate of mixing of the reactants such as to maintain a preselected range of densities of the fuel gas in said conduit means.

3. A fuel cell gas generator control system comprising, in combination: a fuel gas generator comprising means for mixing fuel gas-generating reactants and valve means operable to vary the rate of mixing of the reactants; a fuel cell comprising a pair of electrodes and an electrolyte positioned between and in contact with said electrodes, said fuel cell adapted to consume fuel gas; conduit means connecting one of said electrodes in fuel gas flow relation with said generator; and control means operable in response to the pressure of fuel gas in said conduit means, said control means operatively connected with said valve means to regulate the rate of mixing of the reactants such as to maintain a preselected range of pressure of the fuel gas in said conduit means.

4. A fuel cell gas generator control system comprising, in combination: a fuel gas generator; reaction control means operable to vary the rate of fuel gas generation by said generator; a fuel cell comprising a pair of electrodes and an electrolyte positioned between and in contact with said electrodes, said fuel cell adapted to consume fuel gas; and conduit means connecting one of said electrodes in fuel gas flow relation with said generator; said reaction control means being operable in response to the pressure of fuel gas in said conduit means to regulate the rate of fuel gas generation by said generator such as to maintain a preselected range of pressures of the fuel gas in said conduit means.

5. A fuel cell gas generator control system comprising, in combination: a fuel gas generator including tube means for mixing fuel gas-generating reactants and a valve chamber in said tube means forming an orifice therein; a valve body operable in cooperation with said orifice to vary the rate of mixing of the reactants; a fuel cell comprising a pair of electrodes and an electrolyte positioned between and in contact with said electrodes, said fuel cell adapted to consume fuel gas; conduit means connecting one of said electrodes in fuel gas flow relation with said generator; and a pressure-responsive bellows in fluid communication with said conduit means, said bellows operatively connected with said valve body to regulate the rate of mixing of the reactants such as to maintain a preselected range of pressures of the fuel gas in said conduit means.

References Cited in the file of this patent
UNITED STATES PATENTS

| | | |
|---|---|---|
| 1,315,268 | Wise | Sept. 9, 1919 |
| 2,721,789 | Gill | Oct. 25, 1955 |
| 2,913,511 | Grubb | Nov. 17, 1959 |